United States Patent [19]

Callan

[11] 4,418,374
[45] Nov. 29, 1983

[54] LATCH RELAY DRIVE CIRCUIT

[75] Inventor: John E. Callan, Milwaukee, Wis.

[73] Assignee: Allen-Bradley Company, Milwaukee, Wis.

[21] Appl. No.: 427,567

[22] Filed: Sep. 29, 1982

[51] Int. Cl.³ .......................................... H01H 47/00
[52] U.S. Cl. .................................. 361/167; 361/187; 361/191; 361/210
[58] Field of Search ............... 361/210, 167, 187, 191, 361/172, 171, 92; 307/10 AT

[56] References Cited

U.S. PATENT DOCUMENTS

| | | | |
|---|---|---|---|
| 3,188,529 | 6/1965 | Byrnes et al. | 361/167 |
| 3,590,325 | 6/1971 | McMillen et al. | 361/92 |
| 3,742,313 | 6/1973 | Spencer | 361/210 X |
| 4,148,092 | 4/1979 | Martin | 361/172 |

*Primary Examiner*—Reinhard J. Eisenzopf
*Attorney, Agent, or Firm*—Quarles & Brady

[57] ABSTRACT

A latch-relay drive circuit includes a pair of switching devices for separately energizing the set and reset latch-relay coils. To prevent the latch-relay from remaining set once the power fails, an energy storage device, such as a capacitor charged from the power supply, is automatically switched across the reset coil by a switching circuit once the power supply voltage drops below a predetermined voltage thereby automatically resetting the relay.

7 Claims, 1 Drawing Figure

LATCH RELAY DRIVE CIRCUIT

BACKGROUND OF THE INVENTION

The field of this invention is drive circuits for latch-type relays having separate set and reset coils.

Electromagnetic relays are well known devices which are commonly employed in industrial environments to switch relatively high voltages. Energizing the relay coil with the appropriate voltage causes the relay contacts to open or close, depending on the type of relay, to create either an open or closed circuit with a source of high voltage and a load, such as a motor or lamp. With most relays, the relay coil must remain energized in order to keep the relay contacts in the desired conduction state. If the excitation is removed from the relay coil, then the relay contacts change conduction states.

In some industrial applications, it is necessary to employ a large number of electromagnetic relays for controlling various lamps and motors or the like. Employing a large number of conventional relays requires a very substantial power supply because of the necessity to keep each relay energized to maintain its contacts in the desired conduction state. In such applications, latch-type relays having separate set and reset coils are often substituted for the conventional single coil relay. The latch-type relay avoids the need for constant energization because once the latch relay is set by momentarily energizing the set coil, the relay remains latched. Only when the reset coil is energized will the conduction state of the relay contacts change. Since only a momentary pulse of current is required to latch the contacts of the latch-relay, a much smaller power supply can be employed to drive a large number of relays.

The disadvantage of such latch-type relays is that the relay contacts can remain set after the power supply voltage has failed in contrast to the contact conduction state of a conventional relay which changes once the relay coil is no longer energized from the power supply.

BRIEF SUMMARY OF THE INVENTION

Briefly, in accordance with the preferred embodiment of the invention, an improved driving circuit for a latch-type relay includes a pair of switching devices for momentarily coupling a separate one of the set and reset coils of a latch relay across a power supply to set and reset, respectively, the latch relay. To automatically reset the latch relay when the power supply voltage drops below a predetermined voltage, an energy storage device, typically taking the form of a capacitance, is coupled across the power supply to store energy during intervals while the power supply voltage remains above a predetermined voltage. Once the power supply voltage drops below the predetermined voltage, the energy storage device renders conductive a switching circuit, comprised of a pair of transistors, to discharge the energy storage device across the latch-relay reset coil so as to reset the relay.

It is a general object of the present invention to provide a latch-relay driver circuit which automatically resets the relay by energizing the relay reset coil when the power supply voltage drops below a predetermined voltage. This is accomplished by the combination of the energy storage device coupled across the power supply and a switching circuit which is rendered conductive by the energy storage device once the power supply voltage drops below the predetermined voltage to couple the relay reset coil across the energy storage device so that the relay coil is reset therefrom.

Other objects and advantages of the present invention will become readily apparent from the description of the invention provided hereinafter.

BRIEF SUMMARY OF THE DRAWING

The features of the invention believed to be novel are set forth with particularity in the appended claims. The invention itself, however, both as to organization and method of operation, together with further objects and advantages thereof, may best be understood by reference to the following description taken in conjunction with the accompanying drawings in which:

DETAILED DESCRIPTION OF THE PREFERRED EMBODIMENT

Figure 1:
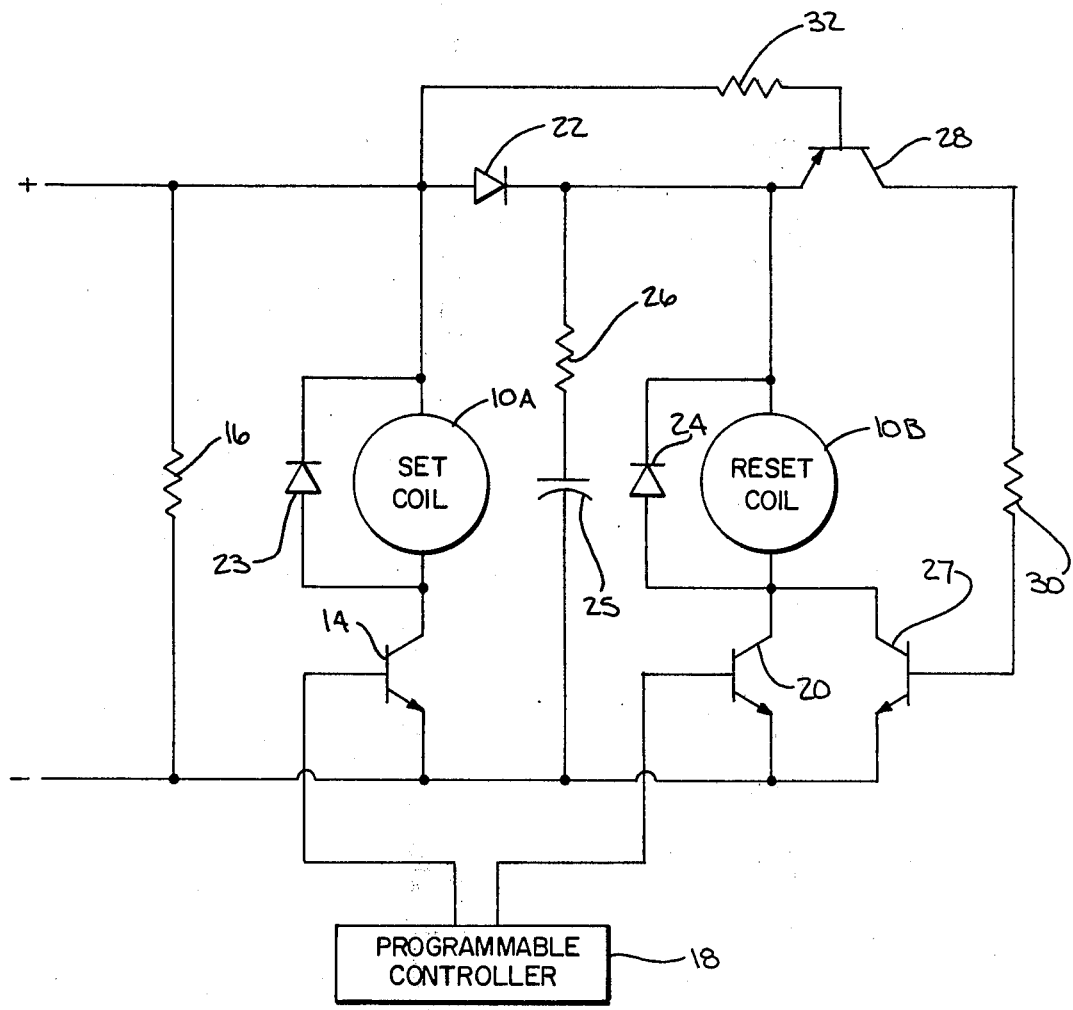
FIG. 1 is an electrical schematic diagram of the latch relay driver circuit constructed in accordance with the present invention.

Referring to the sole FIGURE, a driving circuit for a latch-type relay having a set coil 10A and a reset coil 10B includes a first electronic switch 14 which is coupled in series with set coil 10A across a resistance 16 that shunts a d.c. power supply (not shown). Electronic switch 14 typically comprises a transistor although other types of switching devices such as the output of a logic gate or the like could be substituted in its place. Electronic switch 14 is actuated by a digital control which, preferably takes the form of a programmable controller 18 such as are well known in the art. When rendered conductive in response to an enable signal from the programmable controller 18, electronic switch 14 becomes "closed" causing said coil 10A to be energized from the d.c. supply. Reset coil 10B of the latch relay is connected in a series branch which includes a second electronic switch 20 and a diode 22. This series branch connects across resistance 16. Like electronic switch 14, electronic switch 20 is typically comprised of a transistor whose conduction is controlled by the programmable controller 18. When closed, electronic switch 20 couples reset coil 10B and diode 22 across resistance 16 so that the reset coil is energized from the d.c. supply to reset the relay. Although not a part of the present invention, each of set and reset coils 10A and 10B, respectively, has a separate one of free wheeling diodes 23 and 24 coupled thereacross to provide a circulating path for the inductive currents within the relay coils.

To enable reset coil 10B of the latch-relay to be energized after the voltage across resistance 16 drops below a predetermined voltage, an energy storage device, typically taking the form of a capacitance 25 in series with a resistance 26, is coupled between the cathode of diode 22 and the junction of electronic switches 14 and 20 for storing energy during intervals while the voltage across the resistance 16 remains above a predetermined voltage. A discharge path through the reset coil for the energy stored in capacitance 25 is provided by a transistor 27 whose collector-to-emitter portion is coupled in parallel with electronic switch 20 so that when transistor 27 is rendered conductive, reset coil 10B is energized by the stored potential of capacitance 24. The conduction state of transistor 27 is controlled by a PNP transistor 28 whose collector-to-emitter portion is coupled in series with a resistance 30 between the base of transistor 27 and the cathode of diode 22.

Transistor 28 has its base coupled through a resistance 32 to the anode of diode 22 so that the conduction state of the transistor 28 is controlled by the voltage at the diode anode. While the voltage at the diode anode remains greater than the voltage at the diode cathode, which occurs as long as the d.c. voltage across resistance 16 plus the diode voltage drop is greater than the stored potential of capacitance 25, then, the base-emitter junction of transistor 28 its biased to render the transistor nonconductive so that transistor 27 remains nonconductive. With transistors 28 and 27 both nonconductive during intervals while the voltage across resistance 16 remains above a predetermined voltage, reset coil 10B can only be energized when electronic switch 20 is enabled or closed by programmable controller 18.

When the d.c. supply voltage, as it appears across resistance 16, drops below a predetermined voltage which would otherwise prevent reset coil 10B from being energized even if electronic switch 20 were closed, the reset coil 10B is nontheless reset by the energy stored in the capacitance 25. Once the voltage across current limiting resistance 16 plus the voltage drop of diode 22 decreases below the voltage across capacitance 25 and resistance 26, transistor 28 then becomes conductive to render transistor 27 conductive. With transistor 27 now conductive, the stored charge of the capacitance discharges through resistor 22, the reset coil 10B and transistor 27 thereby resetting the latch-relay.

The foregoing discloses a latch-relay drive circuit which automatically resets the latch-relay upon a power failure.

While only certain preferred features of the invention have been shown by way of illustration, many modifications and changes will occur to those skilled in the art. It is, therefore, to be understood that the appended claims are intended to cover all such modifications and changes as fall within the true spirit of the invention.

What is claimed is:

1. A drive circuit for energizing the set and reset coils of a latch-relay comprising:
a source of potential;
a first electronic switch for coupling the set coil of the latch relay across said source of potential when said electronic switch is enabled so that the set coil is momentarily energized to set the latch-relay;
an energy storage device coupled across said source of potential for storing energy therein while the voltage magnitude of said source of potential is above a predetermined magnitude;
a second electronic switch for coupling the reset coil of the latch relay to said source of potential when said second electronic switch is rendered conductive to energize the reset coil to reset the latch relay; and
a switching circuit responsive to the voltage magnitude difference between said source of potential and the stored potential of said energy storage device for providing a completed circuit path between said energy storage device and the reset coil of the latch relay when the voltage of said source of potential drops below the stored potential of said energy storage device so that the reset coil is energized from the energy stored in said energy storage device to reset the latch relay.

2. The invention according to claim 1 wherein said first and second electronic switches each comprise a transistor.

3. The invention according to claim 1 wherein said energy storage device comprises the serial combination of a resistance and a capacitance.

4. The invention according to claim 1 wherein said switching circuit comprises:
a diode coupled between said source of potential and said energy storage means for providing a unidirectional current path therebetween;
a first transistor having its collector-to-emitter portion coupled in parallel with said second electronic switch; and
a second transistor having its base coupled to the junction of said diode and said source of potential and having its collector-to-emitter portion coupled between the junction of said diode and said energy storage means and the base of said first transistor so that said second transistor becomes conductive when the stored potential of energy storage device becomes greater than said predetermined voltage to render said first transistor conductive thereby providing a discharge path for the energy stored in said energy storage means through the reset coil.

5. The drive circuit for energizing the set and reset coils of a latch-relay, which comprises:
a pair of power terminals for connection to a source of potential;
a first series branch connected across the power terminals and including the set coil and a first electronic switch, the first electronic switch being operable when enabled by a set input signal to energize the set coil;
an energy storage means coupled across the power terminals for storing energy;
a second series branch connected across said energy storage means and including the reset coil and a second electronic switch, the second electronic switch being operable when enabled by a reset input signal to energize the reset coil;
a third series branch connected across the energy storage means and including the reset coil and a third electronic switch, the third electronic switch being operable when the potential across the power terminals drops below a predetermined level to energize the reset coil with energy from the energy storage device.

6. The drive circuit as recited in claim 5 in which the energy storage means is coupled across the power terminals through
a diode which decouples the energy storage means from an attached source of potential when the potential drops below said predetermined level.

7. A drive circuit for energizing the set and reset coils of a latch relay comprising:
a source of potential;
a first electronic switch for coupling the set coil of the latch relay across said source potential when said electronic switch is enabled so that the set coil is momentarily energized to set the latch relay;
an energy storage device coupled across said source of potential for storing energy therein while the voltage magnitude of said potential source is above a predetermined magnitude;
a second electronic switch for coupling the reset coil of the latch relay to said source of potential when said second electronic switch is rendered conductive to energize the reset coil to reset the latch relay; and
a switching circuit responsive to the voltage magnitude of said source of potential for providing a completed circuit path between said energy storage device and said reset coil when the voltage of said source of potential drops below a predetermined magnitude so that said reset coil is energized from the energy stored in said energy storage device to reset the latch relay, said switching circuit comprising:
- a diode coupled between said source potential and said energy storage device for providing a unidirectional current path therebetween;
- a first transistor having its collector-to-emitter portion coupled in parallel with said second electronic switch; and
- a second transistor having its base coupled to the junction of said diode and said source of potential and having its collector-to-emitter portion coupled between the junction of said diode and said energy storage device and the base of said first transistor so that said second transistor becomes conductive when the stored potential of said energy storage device becomes greater than said predetermined voltage to render said first transistor conductive thereby providing a discharge path for energy stored in said energy storage device through the reset coil.

* * * * *